UNITED STATES PATENT OFFICE.

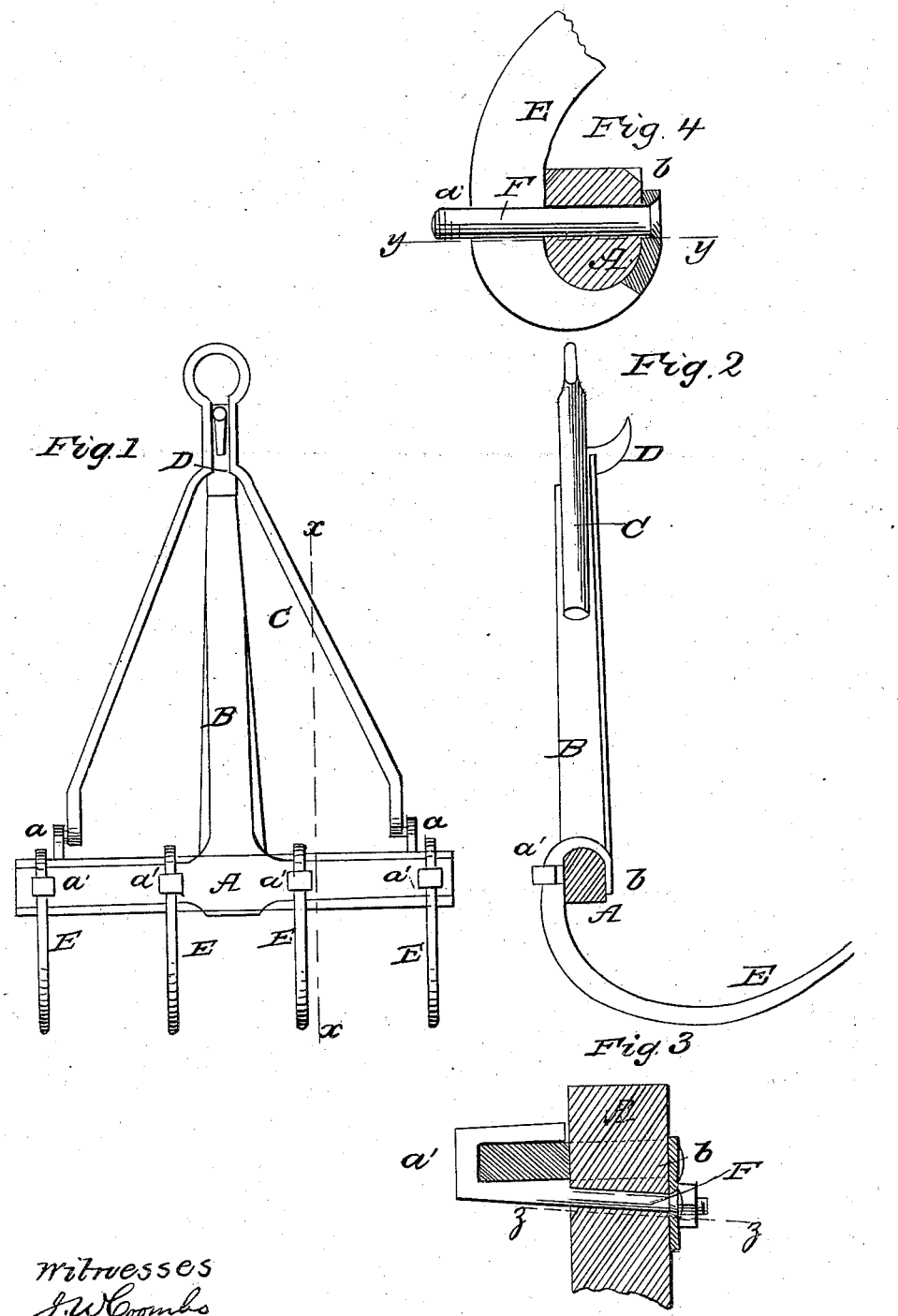

B. F. HISERT, OF NORTON HILL, NEW YORK.

IMPROVEMENT IN HORSE HAY-FORKS.

Specification forming part of Letters Patent No. 39,732, dated September 1, 1863.

*To all whom it may concern:*

Be it known that I, B. F. HISERT, of Norton Hill, in the county of Greene and State of New York, have invented a new and useful Improvement in Horse Pitch-Forks; and I do hereby declare that the following is a full, clear, and exact description of the same, reference being had to the accompanying drawings, making a part of this specification, in which—

Figure 1 is a back view of my invention; Fig. 2, a vertical section of the same, taken in the line $x\,x$, Fig. 1; Fig. 3, a transverse section of the same, taken in the line $y\,y$, Fig. 4; Fig. 4, a section of the same, taken in the line $z\,z$, Fig. 3.

Similar letters of reference indicate corresponding parts in the several figures.

This invention relates to a new and improved mode of securing or attaching the tines of the fork to the head of the same, whereby a very strong and durable fork is obtained with less weight than usual.

The invention consists in having the inner ends of the tines curved so as to wholly or partially extend around the head of the fork, and securing the curved ends of the tines to the head by means of bolts and eyes or sockets, as hereinafter fully set forth.

The most vulnerable part of a horse-pitchfork is the head, to which the tines are attached, the latter passing through the head, and thereby having a tendency to weaken the same, and involving the necessity of bolts passing transversely through the head to strengthen it or prevent it from splitting. The tines also are liable to break just below the head, in consequence of the inner ends of the tines being rounded and made small in diameter, so as not to cause very large holes to be made in the head for the tines to pass through. These difficulties are fully obviated by my invention.

To enable those skilled in the art to fully understand and construct my invention, I will proceed to describe it.

A represents the head of a horse-pitchfork, which is of wood, and B the handle or arm, framed centrally into the head A.

C is a bail, the ends of which are fitted in eyes $a\,a$ on the head, and D is a latch which secures the bail to the handle or arm, the hoisting-rope being attached to the bail. These parts comprise one form or kind of horse-pitchforks; but my invention is applicable to all kinds in which a wooden head, A, is employed.

E represents the tines of the fork, which are of steel—at least that would be the preferable metal. These tines are curved, as shown clearly in Fig. 2, and their inner ends are curved so as to extend around over the top of the head A from its back to its front side, as shown in Figs. 2 and 4. The tines are secured to the head by means of bolts F, which are formed with an eye or socket, $a'$, at one end, and these eyes or sockets encompass the tines while the bolts pass transversely through the head and through the extreme ends $b$ of the tines, which are flattened to receive them, the ends of the bolts F being headed on the ends $b$ of the tines; or they may extend through the ends $b$ sufficiently far to have screw-threads cut on them to receive nuts, as shown by the dotted lines in Fig. 3. By this arrangement it will be seen that the tines are not weakened in consequence of being made small to pass through the head A, as in the ordinary pitchforks, and the heads are not liable to be split in consequence thereof. I can make a much lighter head and have it far more strong and durable than those of the ordinary horse-pitchforks.

I do not confine myself to the precise construction herein shown and described. The inner ends of the tines, for instance, may extend a greater or less distance around the head A and pass from the front side of the latter over to the back, and the eyes $a'$, instead of being formed on the bolts F, may be made separately and with plates for the bolts F to pass through. These modifications, however, would be but equivalents of the plan first described, and shown in the drawings.

Having thus described my invention, what I claim as new, and desire to secure by Letters Patent, is—

The securing of the tines E to the head A of the fork by having the inner ends or parts of the tines curved so as to extend wholly or partially around the head, and having eyes or sockets $a'$ fitted on the tines and secured to the head by bolts F, either attached to or formed with the eyes or sockets, or made separately therefrom, and passing through the eyes or sockets and through the head A and the tines, substantially as described.

B. F. HISERT.

Witnesses:
GEORGE A. STONE,
PLATT BARKER.